(12) United States Patent
Kanda et al.

(10) Patent No.: US 8,737,230 B2
(45) Date of Patent: *May 27, 2014

(54) AUTOMATIC ADJUSTMENT OF LOGICAL CHANNELS IN A FIBRE CHANNEL NETWORK

(75) Inventors: Amit Kanda, San Jose, CA (US); Kung-Ling Ko, Union City, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 766 days.

This patent is subject to a terminal disclaimer.

(21) Appl. No.: 12/913,147

(22) Filed: Oct. 27, 2010

(65) Prior Publication Data

US 2011/0038263 A1    Feb. 17, 2011

Related U.S. Application Data

(63) Continuation of application No. 12/119,440, filed on May 12, 2008.

(60) Provisional application No. 61/002,252, filed on Nov. 7, 2007.

(51) Int. Cl.
    *H04J 1/16*    (2006.01)

(52) U.S. Cl.
    USPC .......................................................... 370/237

(58) Field of Classification Search
    USPC .............. 370/237, 238, 229, 230, 230.1, 231, 370/232, 233, 234, 235, 392, 389, 470, 471, 370/477, 395.21, 395.41, 395.32; 455/452.2; 709/232
    See application file for complete search history.

(56) References Cited

U.S. PATENT DOCUMENTS

| | | | |
|---|---|---|---|
| 5,838,994 A | 11/1998 | Valizadeh | |
| 7,668,177 B1 | 2/2010 | Trapp | |
| 7,916,647 B2 * | 3/2011 | Kanda et al. | 370/237 |
| 2006/0013135 A1 | 1/2006 | Schmidt | |
| 2006/0092932 A1 | 5/2006 | Ghosh | |
| 2006/0233102 A1 | 10/2006 | Kusumoto | |
| 2006/0251067 A1 | 11/2006 | DeSanti | |
| 2007/0174851 A1 | 7/2007 | Smart | |

* cited by examiner

*Primary Examiner* — Chi Pham
*Assistant Examiner* — Alexander O Boakye
(74) *Attorney, Agent, or Firm* — Shun Yao; Park, Vaughan, Fleming & Dowler LLP

(57) ABSTRACT

One embodiment of the present invention provides a system that facilitates automatic adjustment of logical channels in a Fiber Channel (FC) network. During operation, the system receives FC data frames. A respective data frame is associated with a logical channel. The bandwidth on an FC link can be allocated into a plurality of logical channels, and a respective logical channel is associated with a dedicated buffer and can transport a plurality of data flows with data frames of variable length. The system then identifies a slow data flow in a first logical channel. Next, the system assigns the slow data flow to a second logical channel, thereby preventing the slow data flow from slowing down other data flows in the first logical channel. The system subsequently forwards the data frames in the slow data flow on the second logical channel onto an outgoing link.

22 Claims, 10 Drawing Sheets

US 8,737,230 B2

AUTOMATIC ADJUSTMENT OF LOGICAL CHANNELS IN A FIBRE CHANNEL NETWORK

RELATED APPLICATION

This application is a continuation of U.S. application Ser. No. 12/119,440, entitled "AUTOMATIC ADJUSTMENT OF LOGICAL CHANNELS IN A FIBRE CHANNEL NETWORK," by inventors Amit Kanda and Kung-Ling Ko, filed 12 May 2008, which claims the benefit under 35 U.S.C. section 119 to U.S. Provisional Patent Application Ser. No. 61/002,252, entitled "Adaptive Networking Advanced Data Center Fabric Technology," filed 7 Nov. 2007, the disclosure of which is incorporated by reference herein.

The subject matter of this application is related to the subject matter in the following co-pending non-provisional applications:

U.S. patent application Ser. No. 12/119,436, entitled "METHOD AND SYSTEM FOR FACILITATING APPLICATION-ORIENTED QUALITY NETWORK," by inventor Amit Kanda, filed 12 May 2008;

U.S. patent application Ser. No. 12/119,457, entitled "WORKLOAD MANAGEMENT WITH NETWORK DYNAMICS," by inventor Amit Kanda, filed 12 May 2008;

U.S. patent application Ser. No. 12/119,430, entitled "METHOD AND SYSTEM FOR FACILITATING QUALITY OF SERVICE IN EDGE DEVICES IN A FIBRE CHANNEL NETWORK," by inventor Amit Kanda, filed 12 May 2008; and U.S. Pat. No. 7,733,805, entitled "Method and Apparatus for Determining Bandwidth-Consuming Frame Flows in a Network," by inventor Amit Kanda and Sathish Kumar Gnanasekaran, issued 8 Jun. 2010;

the disclosures of which are incorporated by reference in their entirety herein.

BACKGROUND

1. Field

The present disclosure relates to Fibre Channel networks. More specifically, the present disclosure relates to a method and apparatus for automatically adjusting logical channels in a Fibre Channel network.

2. Related Art

The proliferation of the Internet and e-commerce continues to fuel revolutionary changes in the network industry. Today, a significant number of transactions, from real-time stock trades to retail sales, auction bids, and credit-card payments, are conducted online. Consequently, many enterprises rely on existing storage area networks (SANs), not only to perform conventional storage functions such as data backup, but also to carry out an increasing number of egalitarian network functions such as building large server farms.

A predominant form of SAN is the Fibre Channel (FC) network. FC standards were developed based on High Performance Parallel Interface (HIPPI), a data channel standard developed by Los Alamos National Laboratory in the 1980's. HIPPI was designed as a supercomputer I/O interface with high throughput and minimal switching function. As time went on, optical fiber became cheaper and more reliable, and FC was developed as a successor to HIPPI to take advantage of the high capacity of fiber optics. FC can carry data channels including HIPPI, Small Computer Systems Interface (SCSI), and multiplexor channels used on mainframes, as well as network traffic, including IEEE 802, Internet Protocol (IP), and Asynchronous Transfer Mode (ATM) packets. Like HIPPI, the basic topology of an FC network is a star topology with a switch fabric at the center to connect inputs to outputs.

Historically, conventional network appliances (e.g., data-center servers, disk arrays, backup tape drives) mainly use an FC network to transfer large blocks of data. Therefore, FC switches provide only basic patch-panel-like functions. In the past decade, however, drastic advances occurred in almost all the network layers, ranging from the physical transmission media, computer hardware and architecture, to operating system (OS) and application software.

For example, a single-wavelength channel in an optical fiber can provide 10 Gbps of transmission capacity. With wavelength-division-multiplexing (WDM) technology, a single strand of fiber can provide 40, 80, or 160 Gbps aggregate capacity. Meanwhile, computer hardware is becoming progressively cheaper and faster. Expensive high-end servers can now be readily replaced by a farm of many smaller, cheaper, and equally fast computers. In addition, OS technologies, such as virtual machines, have unleashed the power of fast hardware and provide an unprecedented versatile computing environment.

As a result of these technological advances, an FC switch fabric faces a much more heterogeneous, versatile, and dynamic environment. The limited network functions in a conventional switch fabric can hardly meet these demands. For instance, a switch fabric may transport two data flows with different requirements on the same inter-switch link, where one flow is between two mission-critical applications and the other is for a simple data backup. These two flows have different quality of service (QoS) requirements, which are difficult to attain at the same time in conventional FC networks. Furthermore, within the same QoS class, two flows may have different data rates, and the conventional buffer-to-buffer credit-based flow control mechanism in FC networks can cause the links to be severely underutilized.

SUMMARY

One embodiment of the present invention provides a system that facilitates automatic adjustment of logical channels in a Fibre Channel (FC) network. During operation, the system receives FC data frames. A respective data frame is associated with a logical channel. The bandwidth on an FC link can be allocated into a plurality of logical channels, and a respective logical channel is associated with a dedicated buffer and can transport a plurality of data flows with data frames of variable length. The system then identifies a slow data flow in a first logical channel. Next, the system assigns the slow data flow to a second logical channel, thereby preventing the slow data flow from slowing down other data flows in the first logical channel. The system subsequently forwards the data frames in the slow data flow on the second logical channel onto an outgoing link.

In a variation on this embodiment, a respective logical channel is associated with a quality-of-service (QoS) class. A respective QoS class can contain one or more logical channels. The second logical channel is within the same QoS class as the first logical channel.

In a further variation, the second logical channel is a predetermined logical channel reserved for slow data flows in the same QoS class as the first logical channel.

In a further variation, the system dynamically allocates the second logical channel in the same QoS class as the first logical channel, wherein prior to being assigned to a slow data flow the second logical channel can be used for regular data flows.

In a variation on this embodiment, the system suspends the forwarding of the data frames in the slow data flow for a predetermined period subsequent to reassigning the slow data flow to the second logical channel, thereby preventing out-of-order delivery of the data frames in the slow data flow.

In a variation on this embodiment, identifying the slow data flow involves receiving a notification from an FC switch or a host bus adaptor (HBA) coupled to the destination device of the slow data flow. The notification indicates a destination address of the slow data flow.

In a variation on this embodiment, when the slow data flow is no longer sufficiently slow to slow down another data flow, the system assigns this previously slow data flow to a logical channel which is different from the second logical channel.

In a further variation, the system receives a notification from an FC switch or an HBA coupled to the destination device of the previously slow data flow, wherein the notification indicates a destination address of the previously slow data flow.

One embodiment of the present invention provides a system for automatically adjusting logical channels in an FC network. During operation, the system receives FC data frames on a first logical channel at an FC switch or HBA. The data frames are destined to a destination device coupled to the FC switch or HBA. The bandwidth on an FC link can be allocated into a plurality of logical channels, and a respective logical channel is associated with a dedicated buffer and can transport a plurality of data flows with data frames of variable length. The system then determines that the destination device is congested or slow. The system further sends to one or more FC switches and/or HBAs associated with the sources of data flows to the slow or congested destination in the FC network a notification which indicates the address of the destination device, thereby allowing the data frames destined to that destination device to be assigned to a second logical channel to prevent slowing down of other data flows on the first logical channel.

In a further variation, determining that the destination device is congested involves determining the amount of time a respective data frame is buffered before the data frame is transmitted to the destination.

In a further variation, the system determines the source of the data frames, wherein the notification is only sent to the FC switch or HBA coupled to the source.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, application-specific integrated circuits (ASIC), field-programmable gate arrays (FPGA), volatile memory, non-volatile memory, magnetic and optical storage, or other media capable of storing computer-readable media now known or later developed.

Overview

Embodiments of the present invention facilitate automatic adjustment of data flows in logical channels in an FC network. Particularly, a switch or host bus adaptor (HBA) can automatically move a slow data flow to a common virtual channel used for slow flows, so that the slow data flow does not impair the transfer of other, faster flows due to the head-of-queue blocking problem. Furthermore, since virtual channels are associated with QoS classes, a slow flow can be moved to a virtual channel within the designated QoS class, thereby ensuring that the hosts for that data flow can still enjoy their fair share of the link bandwidth.

Figure 1:
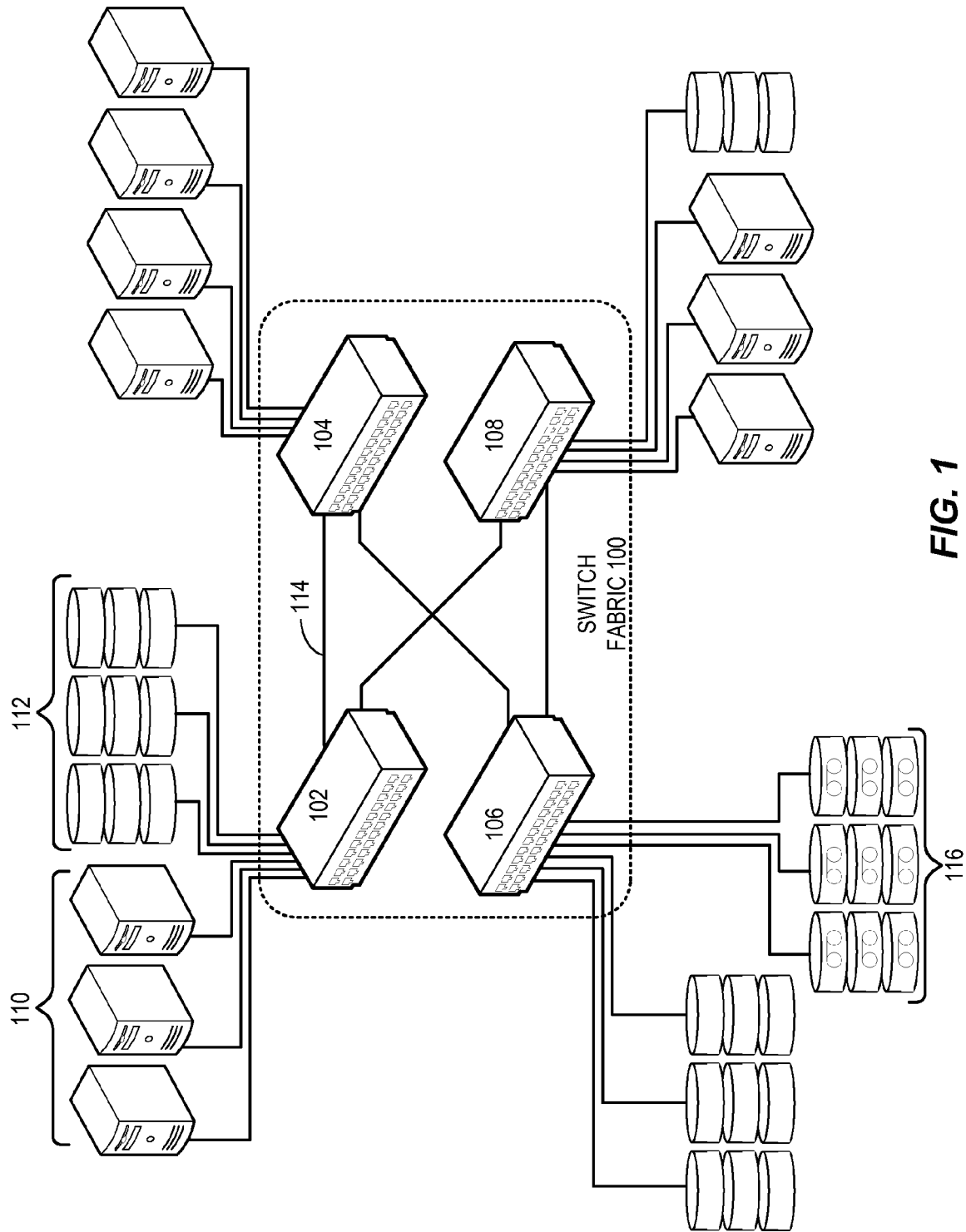
FIG. 1 illustrates an exemplary FC network that facilitates automatic logical-channel adjustment, in accordance with an embodiment of the present invention.

FIG. 1 illustrates an exemplary FC network that automatic logical-channel adjustment, in accordance with an embodiment of the present invention. In this example, an FC switch fabric 100 includes four switch modules, 102, 104, 106, and 108. Each switch module is coupled to a group of network appliances.

For example, switch module 102 is coupled to a number of servers 110 and a number of disk arrays 112. A respective network appliance can communicate with any appliance (referred to as "target") in the FC network.

For example, one of the servers 110 can transfer data to and from one of tape backup devices 116. Note that, since the switch modules are not connected in a fully meshed topology, the data frames transferred between servers 110 and tape devices 116 traverse three switch modules 102, 104, and 106. In general, the switch modules are coupled by inter-switch links (ISLs), such as ISL 114.

As shown in the example in FIG. 1, large-port-count FC switch fabrics often include a number of smaller, interconnected individual switches. The internal connectivity of a switch fabric can be based on a variety of topologies. In this disclosure, the term "switch fabric" refers to a number of interconnected FC switch modules. The terms "switch module" and "switch" refer to an individual switch which can be connected to other switch modules to form a larger port-count switch fabric. The term "edge device" refers to any network appliance, either physical or logical, coupled to a switch.

A switch typically has two types of ports: fabric port (denoted as F_Port), which can couple to a network appliance, and extension port (E_Port), which can couple to another switch. A network appliance communicates with a switch through a host bus adaptor (HBA). The HBA provides the interface between an appliance's internal bus architecture and the external FC network. An HBA has at least one node port (N_Port), which couples to an F_Port on a switch through an optical transceiver and a fiber optic link. More details on FC network architecture, protocols, naming/address convention, and various standards are available in the documentation available from the NCITS/ANSI T11 committee (www.t11.org) and publicly available literature, such as "Designing Storage Area Networks," by Tom Clark, 2nd Ed., Addison Wesley, 2003, the disclosure of which is incorporated by reference in its entirety herein.

The heterogeneous nature of modern FC networks imposes new challenges. In conventional FC networks, the appliances are mostly for data storage or backup purposes and usually have similar QoS requirements and data-processing speeds. However, today's FC networks are often used for a variety of purposes, and the appliances in an FC network can have drastically different QoS requirements and data-processing speeds. It is possible to provision differentiated QoS classes on an FC physical link by dividing the bandwidth into logical channels (also referred to as "virtual channels). Different virtual channels can be grouped into different QoS classes, and can isolate the data frames transported therein. Furthermore, different QoS classes can be associated with a large range of entities at different hierarchies, e.g., physical machine, virtual machine, application, and sub-application message groups. Note that in this disclosure the term "QoS" or "quality of service" refers to an arbitrary set of service quality parameters. A QoS level or class can be based on an arbitrary number of metrics. For example, a given QoS level can specify a guaranteed or best-effort data rate. A more sophisticated QoS level can further specify other parameters, such as maximum delay and delay variation, maximum data frame loss rate, and maximum frame misdelivery rate.

Although virtual channels can isolate traffic within different channels, the FC network can still suffer from underutilization, because different data flows within the same virtual channel can cause head-of-queue blocking problems and unnecessarily reduce the utilization of an FC link. Embodiments of the present invention provide a mechanism that can automatically detect and adjust slow data flows in virtual channels, thereby mitigating this underutilization problem.

Virtual Channel and QoS

Conventionally, to prevent a target device from being overwhelmed with data frames, an FC network provides several flow control mechanisms based on a buffer credit system. A credit represents a device's ability to accept one frame. A sender maintains a transmission buffer, and transmits one frame from the buffer when a credit is received from the receiving device. In previous generations of FC switches, each outgoing link on a switch or HBA is associated with one buffer. This buffer is responsible for storing data frames from data flows. In this disclosure, the term "data flow" is loosely defined as the data frames flowing from a source entity to a destination entity. In one embodiment, the source can be identified by a source ID (S_ID), and a destination can be identified by a destination ID (D_ID). In conventional FC networks, the source ID refers to the outgoing port on the source HBA, and the destination ID refers to the incoming port on the destination HBA. In this disclosure, however, a source or destination ID can be associated with a wide range of logical entities, including a physical appliance (e.g., a physical server) to which an HBA belongs, a virtual appliance, an application, or a sub-application message group.

One problem associated with the conventional buffer configuration is that it is very difficult to provide different QoS to different data flows when these data flows are transported on a common link. For example, a low-priority data flow may travel on a common link with a high-priority data flow. The data frames from these two flows are mingled in the common buffer, which makes provisioning of differentiated QoS difficult.

One way to solve this problem is to divide the bandwidth in an inter-switch or switch-to-HBA link into logical channels and serve each logical channel with a separate buffer. This way, data flows of different priorities can be assigned to different logical channels and, since each logical channel has a separate buffer, the data flows can be sufficiently isolated from each other. Furthermore, a switch can provision different QoS levels to the logical channels by using various buffer scheduling schemes. For example, the switch can allocate different guaranteed or best-effort data rates to different logical channels or groups of logical channels by using a weighted round-robin scheme when retrieving and transmitting data frames stored in the different buffers.

In one embodiment, such logical channels are referred to as "virtual channels" or "VCs." More implementation details of virtual channels are disclosed in U.S. Pat. No. 7,239,641, entitled "Quality of Service Using Virtual Channel Translation" by Banks, et al., and "Virtual Channels for Switched Fabric" by Martin, et al., available at www.t10.org/ftp/t11/document.04/04-093v0.pdf, the disclosure of which is incorporated by reference herein in its entirety.

Note that the virtual channel in FC networks should be distinguished from the "virtual circuit" (which is sometimes also called "virtual channel") in ATM networks. An ATM virtual circuit is an end-to-end data path with a deterministic routing from the source to the destination. That is, in an ATM network, once the virtual circuit for an ATM cell is determined, the entire route throughout the ATM network is also determined. More detailed discussion on ATM virtual circuits can be found in "Computer Networks," Section 5.6, by A. S. Tanenbaum, 3rd Ed., Prentice-Hall, 1996.

In contrast, an FC virtual channel is a local logical channel on a physical link, between two switches or between a switch and an HBA. That is, an FC virtual channel only spans over a single link. When an FC data frame traverses a switch, the virtual channel information can be carried by appending a temporary tag to the frame. This allows the frame to be associated to the same VC identifier on outgoing link of the link. However, the VC identifier does not determine a frame's routing, because frames with different destinations can have the same VC identifier and be routed to different outgoing ports. An ATM virtual circuit, on the other hand, spans from the source to the destination over multiple links. Furthermore, an FC virtual channel carries FC data frames, which are of variable length. An ATM virtual circuit, however, carries ATM cells, which are of fixed length.

Figure 2:
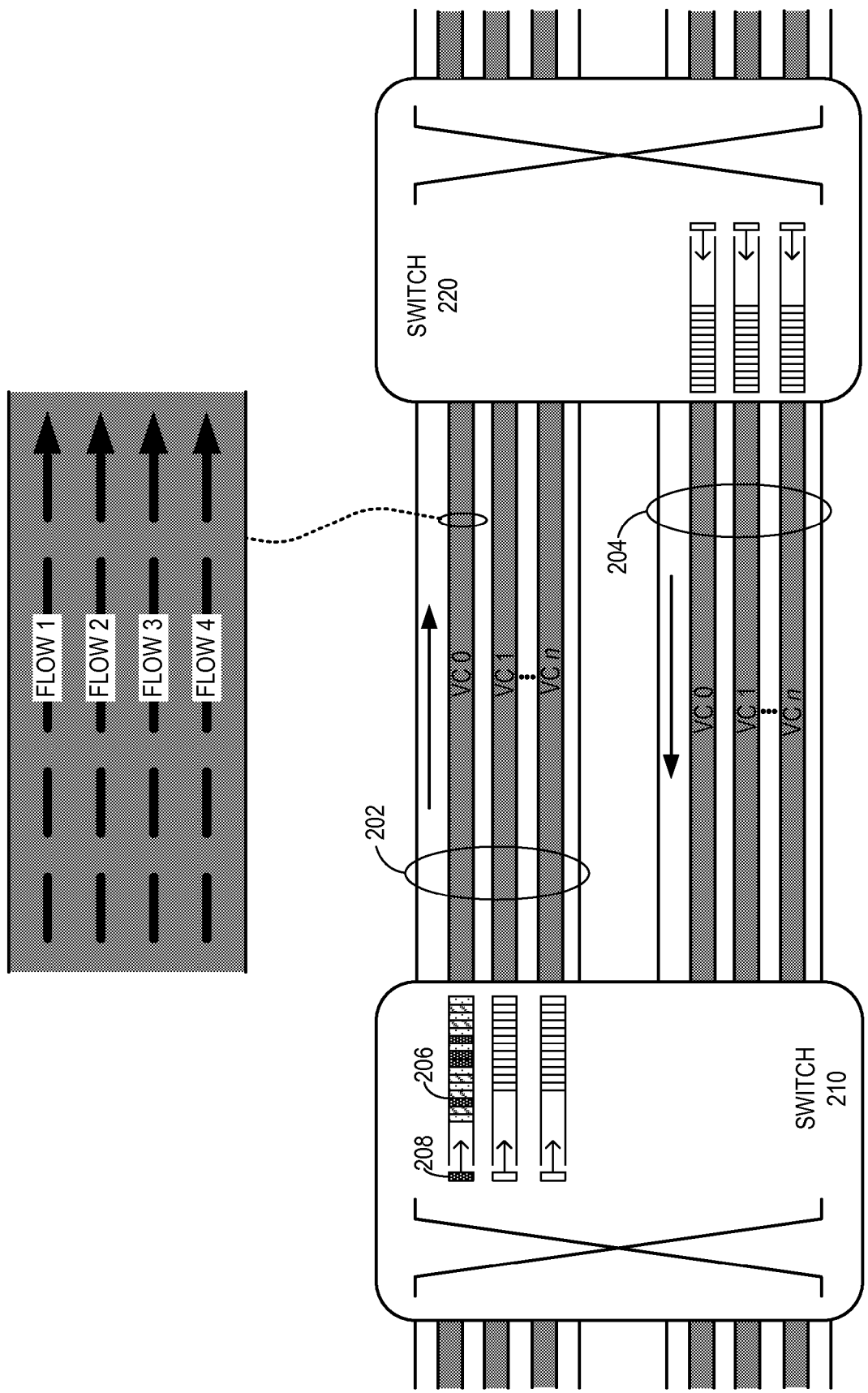
FIG. 2 illustrates exemplary virtual channels and data flows, in accordance with an embodiment of the present invention.

FIG. 2 illustrates exemplary virtual channels and data flows, in accordance with an embodiment of the present invention. In this example, a switch 210 is coupled to a switch 220 by an outgoing physical link 202 and an incoming physical link 204. Each physical link is divided into a number of virtual channels. For example, link 202 is divided into virtual channels VC 0, VC 1, ..., VC n. A respective virtual channel is associated with a buffer dedicated to that virtual channel. Furthermore, a buffer may store data frames from a number of data flows. Correspondingly, a virtual channel can carry multiple data flows.

For example, VC 0 on link 202 is associated with a transmission buffer 206 in switch 210. Buffer 206 stores data frames from multiple data flows, such as data frame 208. Note that in FIG. 2 different frames of different data flows in buffer 206 are presented with different fill patterns. FIG. 2 also illustrates a zoomed-in view of the contents of VC 0 on link 202. Here VC 0 of link 202 carries four data flows, FLOW 1, 2, 3, and 4. Note that these flows may correspond to the same source and destination or to a different source and destination. In other words, although these flows share the same virtual channel on link 202, they might belong to different end-to-end routes. This is an important distinction between FC virtual channels and ATM virtual circuits, because all the data cells in an ATM virtual circuit belong to the same source/destination pair.

In one embodiment, the VCs on a link can be assigned to different QoS levels, and the switch can schedule transmission from their respective buffers accordingly. For example, among all the VCs on a link, some VCs may have guaranteed bandwidth, wherein the switch periodically serves the buffer associated with these VCs to guarantee a minimum data rate. Other VCs may be assigned different weights and may participate in a weighted round-robin scheme in transmitting frames in their respective buffers. Note that a variety of buffer-scheduling schemes can be used to achieve different QoS results.

Figure 3:
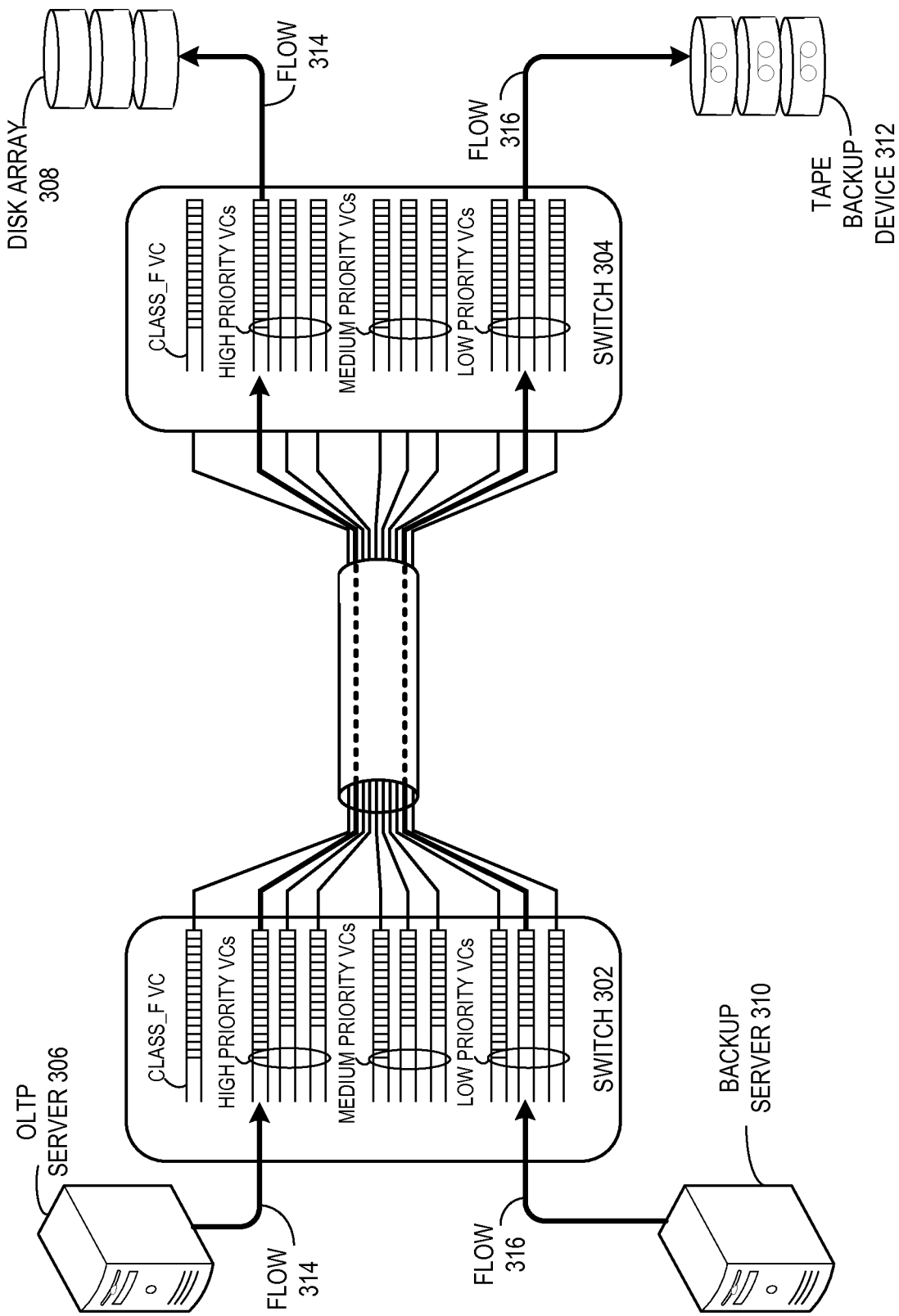
FIG. 3 illustrates an example of providing different QoS to different data flows in an FC switch fabric, in accordance with an embodiment of the present invention.

FIG. 3 illustrates an example of providing different QoS to different data flows in an FC switch fabric, in accordance with an embodiment of the present invention. In this example, the physical link between switches 302 and 304 contains a number of VCs. These VCs are grouped into several QoS classes: Class_F, high priority, medium priority, and low priority. The Class_F VC corresponds to the Class_F traffic as defined in the FC standards and carries critical network control and management traffic. In one embodiment, the Class_F VC (or VCs) is served with a strict-priority scheduling scheme. The other three QoS classes can use a weighted round-robin scheduling scheme. In one embodiment, a respective VC in the high, medium, and low QoS classes is assigned a relative weight.

In the example in FIG. 3, a data flow 314 is originated from an online transaction processing (OLTP) server 306 and destined for a disk array 308. Flow 314 carries mission-critical transaction data, and therefore is assigned to a VC with high priority. Meanwhile, a second data flow 316 is carried on the same physical link. Data flow 316 is between a backup server 310 and a tape backup device 312. Flow 316 is assigned to a VC with a low priority, because data backups typically do not require fast response time as do OLTP transactions. Since each VC has a separate buffer, flows 314 and 316 can be transported on the same physical link independent from each other. In other words, even if tape backup device 312 is slow in processing data frames, data frames from flow 316 do not interfere with the data transfer of flow 314.

Although the VC configuration illustrated in FIG. 3 can isolate data flows between switches, a new challenge arises when one physical machine runs multiple virtual machines or applications and produces multiple data flows. For example, when OLTP server 306 runs multiple copies of virtual servers or different applications, the data generated by each virtual server or application may be of different importance. However, if all the data are co-mingled and share the bandwidth of the link between the HBA of server 306 and switch 302, the low-priority data can block and slow down high-priority data. Such a problem exists because conventional HBAs are nothing more than a network interface card. When the host machine is virtualized and different applications have different QoS requirements, the limited functions of a network interface card can no longer suffice.

One solution to this challenge is to extend VC and QoS capabilities to the logical entities with different granularities associated with an HBA. Such logical entities include, but are not limited to: physical appliances, virtual appliances, applications, and sub-application message groups. A physical appliance can be any physical device that can communicate with an FC switch, such as a server, a disk array, or a tape backup device. A virtual appliance can be any logical device, such as a virtual machine or a virtual drive. An application can be any program running on a physical or virtual appliance. A sub-application message group can be any set of data that are communicated within an application. For example, the critical financial transaction data communicated within an e-commerce application can be one message group, while the data exchange for regular browsing can be a different message group.

Previously, the VC-based differentiated QoS classes were only available on inter-switch links. However, with the HBA extension, VC-based QoS can now be provided to the end points residing with the HBAs. Furthermore, these end points are not limited to physical entities, but can include any type of logical entities at different levels. Such extension significantly improves the flexibility of the FC network. With these new capabilities, an FC network can quickly adapt to a dynamic and heterogeneous network environment.

Figure 4:
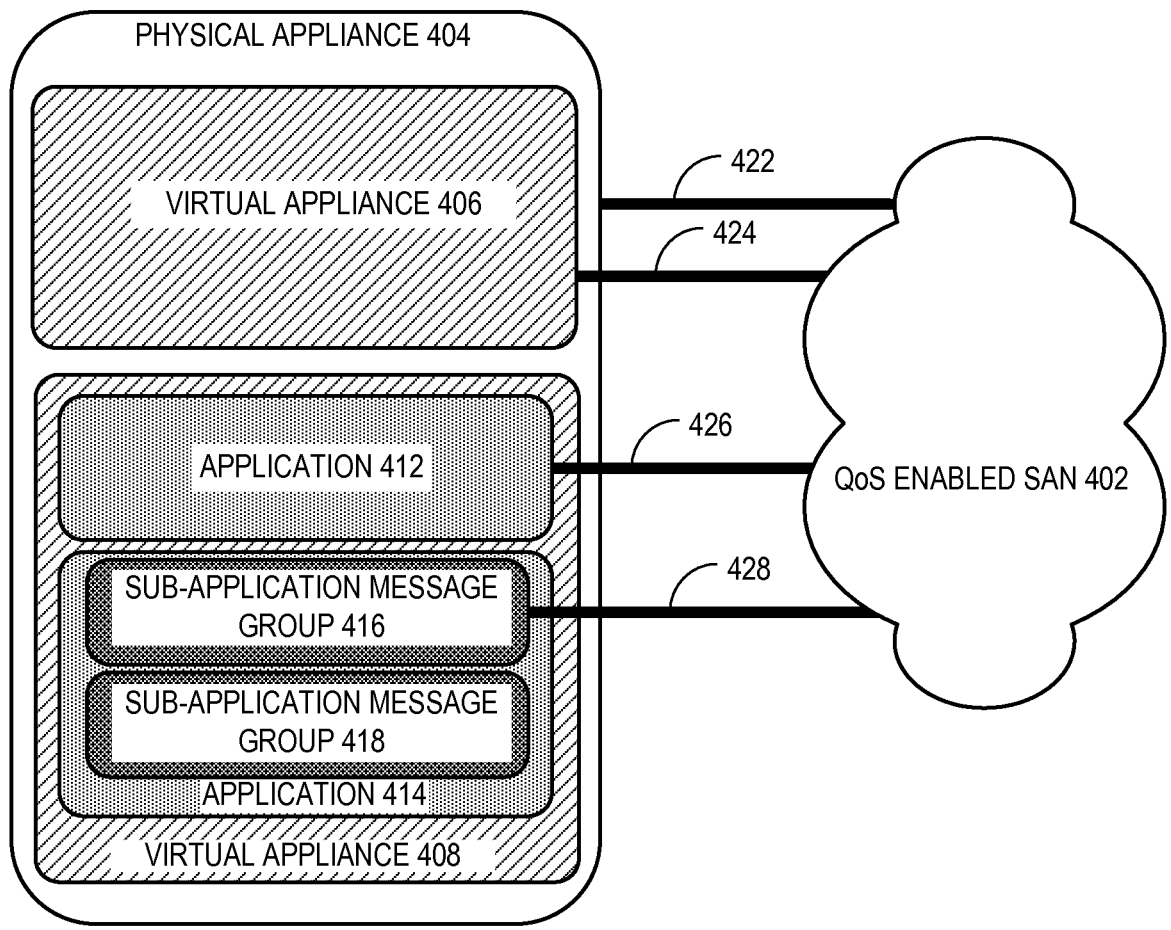
FIG. 4 illustrates QoS provisioning to different logical entities within a physical appliance, in accordance with an embodiment of the present invention.

FIG. 4 illustrates QoS to different logical entities within a physical appliance, in accordance with an embodiment of the present invention. The example in FIG. 4 shows how different logical entities, or device objects, can be classified and associated with VCs. In one embodiment, a network end device has an outer object which is a physical appliance, such as physical appliance 404, and which can be referred to by an FC network address (world-wide name or N_Port). Physical appliance 404 may host one or more virtual appliances, such as virtual appliances 406 and 408, each of which can also be referred to by an FC network address, such as an N_Port ID Virtualization (NPIV) address. Similarly, a virtual appliance may host multiple applications, such as applications 412 and 414, and a respective application may include many sub-application message groups, such as sub-application message groups 416 and 418.

In one embodiment, each level of the logical entities is referred to as an object class. For example, there can be a physical-appliance class, a virtual-appliance class, an application class, and a sub-application class. Other definition of object classes is also possible. Each object in an object class, e.g., a physical appliance, a virtual appliance, or an application, can be associated with an individual VC and a QoS class. For example, physical appliance 404 can send data to a QoS-enabled SAN 402 using VC 422. Meanwhile, virtual appliance 406, application 412, and sub-application message group 416 can each transfer data to SAN 402 via VCs 424, 426, and 428 respectively. Note that to implement differentiated QoS provisioning to the logical entities, the HBA associated with physical appliance 404 is capable of assigning data flows to virtual channels and virtual channels to QoS classes. Details of how to implement a VC and QoS-enabled HBA are provided in U.S. patent application Ser. No. 12/119,436, entitled "Method and System for Facilitating Application-Oriented Quality of Service in a Fibre Channel Network," by inventor Amit Kanda, filed May 12, 2008, and U.S. patent application Ser. No. 12/119,430, entitled "Method and System for Facilitating Quality of Service in Edge Devices in a Fibre Channel Network," by inventor Amit Kanda, filed May 12, 2008, the disclosures of which are incorporated herein in their entirety.

Automatic VC Adjustment to Improve Network Utilization

Although virtual channels are a powerful tool for provisioning QoS and isolating data flows with different priorities, they are not sufficient to solve another problem associated with co-mingled data flows: network underutilization. The example in FIG. 5A illustrates such a problem.

Figure 5A:
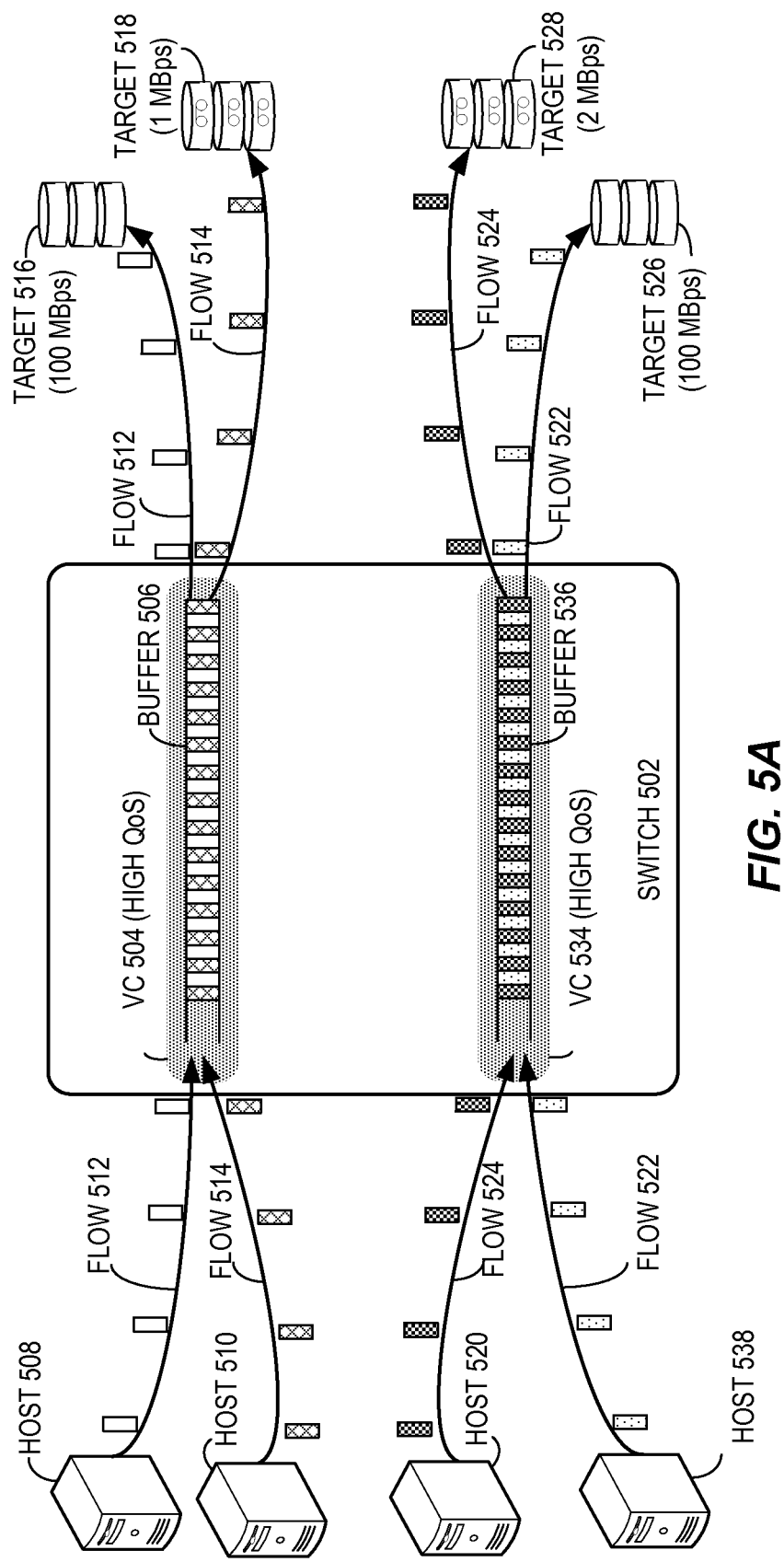
FIG. 5A illustrates an exemplary scenario where slow data flows can block and slow down other data flows in the same virtual channel.

In FIG. 5A, an FC switch 502 handles, among others, two VCs 504 and 534, both of which belong to a high QoS class. Note that switch 502 may have multiple incoming and outgoing links, and each link may contain a number of VCs in different QoS classes. In this example, VCs 504 and 534 are each capable of transmitting data at 100 MBps. VC 504 carries two data flows 512 and 514. Data flow 512 is between a fast host 508, which is capable of transmitting data at 100 MBps, and a fast target 516, which is also capable of consuming data at 100 MBps. Data flow 514 is between a fast host 510, which is capable of transmitting data at 100 MBps, and a slow target 518, which is capable of consuming data at 1 MBps. Since VC 504 is served with a single buffer 506, the data frames from both data flows 512 and 514 are co-mingled in buffer 506. Although VC 504 can transmit data stored in buffer 506 at a data rate of 100 MBps, because target 528 can only consume data at 1 MBps, data frames for flow 514 can only be retrieved from buffer 506 at approximately 1 MBps due to the buffer-to-buffer credit-based flow control mechanism. Furthermore, because of the serial nature of buffer 506, a frame in flow 514 can block other data frames in flow 512, thereby creating a head-of-queue blocking problem. As a result, flow 512 can only be transmitted at an effective data rate similar to that for flow 514, which is 1 MBps. Therefore, the total data rate on VC 504 is approximately 2 MBps, which is significantly below its capacity of 100 MBps. Such underutilization is very undesirable, because host 508 and target 516 can only exchange data at approximately 1% of their capable data rate.

Similarly, VC 534 carries a fast flow 522 between host 538 and target 526 capable of transferring data at 100 MBps, and a slow flow 524 between host 520 and target 528 capable of transferring data at 2 MBps. Consequently, flow 522 is considerably slowed down by flow 524 to 2 MBps, and the total data rate on VC 534 is 4 MBps, a mere 4% of its total capacity. The aggregate throughput of VC 504 and 534 is only 6 MBps, which is only 3% of their full capacity, 200 MBps.

Note that in the example illustrated in FIG. 5A, the data frames of different flows are represented by different fill patterns. Although the frames of different flows appear to be evenly interleaved in the buffers, in practice the distribution of the frames in a buffer may be random, because there is typically no coordination between two data flows sharing one VC. Furthermore, each frame may have arbitrary length, although they are represented by rectangles of the same size in FIG. 5A.

Figure 5B:
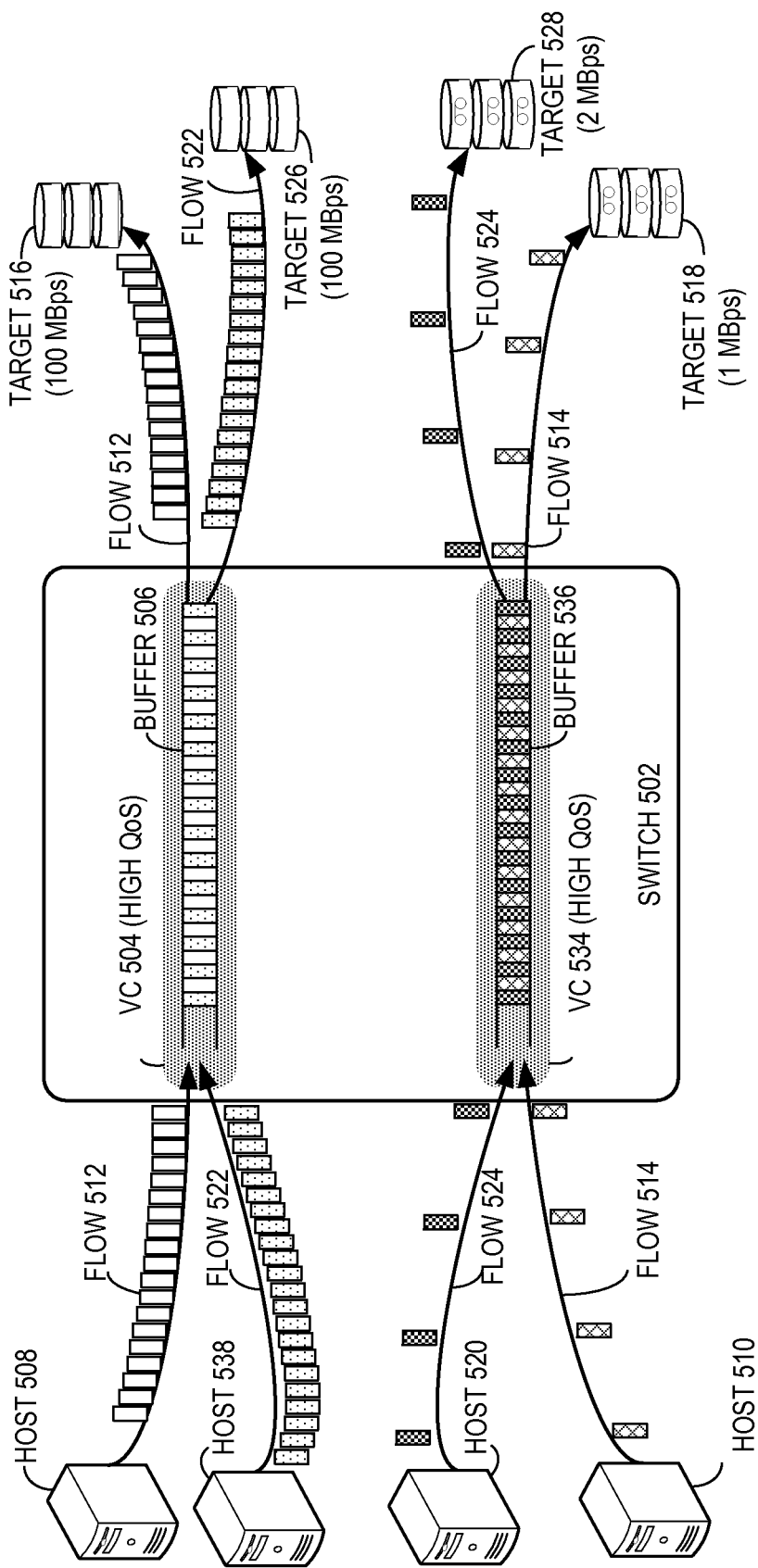
FIG. 5B illustrates how network utilization can be improved after automatic adjustments of data flows in virtual channels, in accordance with an embodiment of the present invention.

Embodiments of the present invention provide a mechanism that can automatically adjust the data flows among VCs within the same QoS class and avoid or mitigate the network-underutilization problem. FIG. 5B illustrates how this mechanism can be applied to the example illustrated in FIG. 5A. In one embodiment, one of the slow flows, flow 514, is re-assigned to VC 534. Fast flow 522 is moved to VC 504. Consequently, VC 504 now carries two fast flows 512 and 522, which allows VC 504 to run at its full data rate 100 MBps. Note that flows 512 and 522 each run at approximately 50 MBps, half of their top data rate. Nevertheless, VC 504 is more or less fully utilized, and flows 512 and 522 can now enjoy a huge increase in their data rates.

VC 534, on the other hand, is now used only for the slow flows. Since flows 514 and 524 share buffer 536, the data rate of flow 524 is limited to the slower data rate of flow 514. Hence, the aggregate data rate of VC 534 is 2 MBps. Nevertheless, this slower data rate does not significantly impact the performance of flows 524 and 514, because their respective targets can only consume data at comparable speeds.

In general, the re-allocation of data flows to a VC used only for slow flows ideally takes place at the device (switch or HBA) where the flows are first assigned to VCs. This way, the switches along the data path can operate in a pass-through mode without changing the VC designation of a respective data flow. Furthermore, the detection of a slow target or destination can be performed at a device that is the endpoint of a VC, so that the device can communicate a notification about this slow destination to other switches or HBAs in the FC network. The switches or HBAs at the source of flows to this destination can reassign the flows to a VC used only for slow flows.

Note that the VC used for slow flows is ideally in the same QoS class as the VC to which the slow flows are previously assigned. This restriction ensures that after a slow flow is reassigned to the reserved VC, it can still receive the same level of QoS. In one embodiment, all the devices (switches or HBAs) that perform reassignment of slow flows agree on a common VC within a given QoS class. For example, the VC with the highest index number within a QoS class can be used only for slow flows.

There are two approaches to assign slow flows to a common VC. One approach is to pre-allocate a reserved VC for slow flows in each QoS class. In this approach, each VC-enabled device (switch or HBA) agrees from the start that a predetermined VC is reserved only for slow flows. For example, a low-priority QoS class has three VCs (e.g., VC1, VC2, and VC3). One of the three VCs, say VC3, is pre-allocated for slow flows. When the flows designated for the low-priority QoS class are initially allocated to the VCs, only VC1 and VC2 are used. Later, if one or more slow flows are detected, the slow flows are moved to VC3. Using a pre-allocated VC for slow flows can minimize the amount of flow reassignment, because only slow flows need to be moved. The regular flows can stay in the VCs to which they are originally assigned. On the other hand, if there are no slow flows in that QoS class, the VC reserved for slow flows can be an overhead because the capacity in the reserved VC is not utilized.

A second approach is to dynamically allocate a VC for slow flows within a QoS class. In this approach, all the VCs in the QoS class are initially used for carrying data flows. Later, when one or more slow flows are detected, a commonly agreed VC, say VC3, is used to carry only slow flows. All the flows previously allocated to VC3 are moved to VC1 and VC2. This approach allows higher utilization when there are no slow flows. However, it involves more flow reassignment during transition, which may incur some overhead to the network. In a dynamic network with medium to heavy load, it might be preferable to use the second approach because it can maximize the system performance.

Automatic VC adjustment works better when slow destinations are detected at a VC endpoint. It might be difficult to perform automatic VC adjustments at a device that is in the middle of a data path. In one embodiment, the detection of a slow destination can be performed by a switch at its egress F_Port which is coupled to the HBA of a slow destination device. In other embodiments, the detection of a slow destination can be performed by a VC-enabled HBA coupled to a destination device. Note that a destination device can be any logical entity, including physical and virtual appliances, applications, and sub-application message groups.

After a switch or HBA detects a slow destination, the switch or HBA can broadcast a notification to all the other switches and/or HBAs in the network about the slow destination. It is also possible for the switch or HBA to send the notification to selective switches of HBAs that are associated with the sources of data flows to the slow destination. The determination of the source switch or HBA can be performed at the same point where congestion is detected. In response, the devices which are the initial VC-allocation points for data flows to that destination can reassign the corresponding flows to a predetermined VC used for slow flows. As described above, this predetermined VC can be pre-allocated (reserved) or dynamically allocated. Note that, in one embodiment, the switches that are not the starting point where the slow flows are first assigned to VCs do not need to perform any flow reassignment if these switches are in a VC pass-through mode, because the reassignment is performed at the start point of the slow flows.

Figure 6:
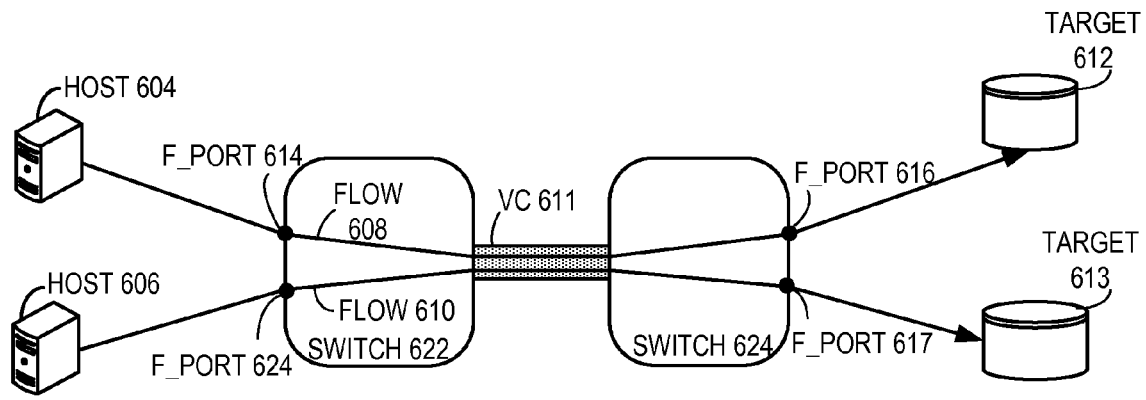
FIG. 6 illustrates how an egress switch can detect and report slow data flows, in accordance with an embodiment of the present invention.

FIG. 6 illustrates how an egress switch can detect and report slow data flows, in accordance with an embodiment of the present invention. In this example, it is assumed that the HBAs in the network appliances are not VC enabled. In other words, when a data flow is delivered to an ingress F_Port, the corresponding FC switch is responsible for assigning the data flow to a VC. As shown in FIG. 6, in a QoS-enabled SAN, hosts 604 and 606 are the respective sources for two flows 608 and 610, which are destined to targets 612 and 613, respectively. Flows 608 and 610 are initially assigned to a regular VC 611 within a given QoS class, and traverse both switches 622 and 624. During operation, the egress switch 624 monitors the traffic at both egress ports F_Port 616 and F_Port 617, which carry flows 608 and 610 respectively.

In one embodiment, the detection of a slow destination is performed at both F_Port 616 and F_Port 617. In general, if the receiving end of an FC link is slow in consuming incoming data, the receiving end will return credits to the transmitting end at a slower rate. In the example in FIG. 6, since target 612 and target 613 are connected to switch 624 through two different ports, switch 624 can differentiate flow 608 from flow 610. When target 612 is slow in consuming data transmitted by F_Port 616, the average wait time between two consecutive data-frame transmissions will surpass a predetermined threshold, and the transmission queue corresponding to F_Port 616 will be backed up. In one embodiment, switch 624 uses a congestion counter to measure this average inter-frame wait time. When the measured congestion is above a certain threshold, switch 624 determines that target 612 is a slow destination, and sends a notification to other devices in the SAN to notify them of this slow destination. In response, switch 622, which initially assigns VC 611 to both flows 608 and 610 when they arrive at F_Port 614 and F_Port 624, moves the slow flow 608 to another VC reserved for slow flow in the QoS class. This way, other regular flows, such as flow 610, can be relieved from the head-of-queue blocking problem and enjoy the full VC capacity.

Note that in this disclosure the slow data transfer caused by slow data consumption at a destination is sometimes referred to as "congestion." The term "congestion" used herein does not necessarily mean that the link is overloaded. It can also mean that there is data in the transmission buffer, but not enough buffer-to-buffer credit to transmit that data.

Figure 7:
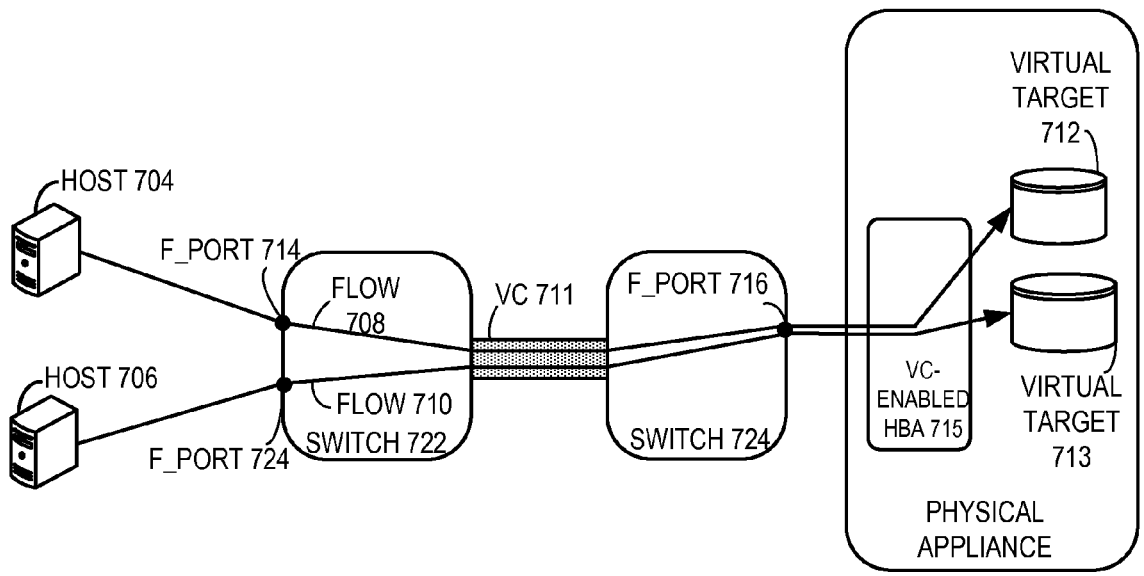
FIG. 7 illustrates how a destination HBA can detect and report slow data flows, in accordance with an embodiment of the present invention.

When HBAs are equipped with VC and QoS capabilities, it is ideal for the HBAs to perform slow-destination detection and flow reassignment, since the HBAs are typically the originating and terminating points of VCs. FIG. 7 illustrates how a destination HBA can detect and report slow data flows, in accordance with an embodiment of the present invention. In this example, a host 704 initiates a data flow 708 to a virtual target 712, and host 706 initiates a data flow 710 to virtual target 713. Data flows 708 and 710 enter a switch 722 at F_Port 714 and F_Port 724, respectively. Switch 722 assigns these flows to a common VC 711. Note that hosts 704 and 706 can be virtual servers residing on the same physical appliance. If this is the case, a VC-enabled HBA can assign VC 711 to flows 708 and 710. Note that in this example the allocation of VCs among QoS classes is assumed to be consistent throughout the entire SAN.

Both virtual targets 712 and 713 reside on a physical appliance, and are coupled to a switch 724 via a VC-enabled HBA 715. However, since both flows 708 and 710 leave switch 724 from the same F_Port 716, it is difficult, if not impossible, for switch 724 to distinguish the two flows. Hence, it is difficult for switch 724 to detect a slow target. Note that this is true irrespective of whether VCs are enabled on the link corresponding to F_Port 716. If VCs are enabled on this link, since both flows are mapped to the same VC, the congestion detection mechanism on switch 724 can only determine that VC 711 is congested but is not able to tell which flow is causing the problem without looking into each data frame's destination address (which is an computationally expensive operation). Hence, it is more ideal for HBA 715 to monitor its queue status and data transfer rate for each flow, since HBA 715 is responsible for separating and dispatching the two flows to their respective targets.

Upon detecting that virtual target 712 is a slow destination, HBA 715 sends a notification to other devices, including switch 722. Upon receiving this notification, switch 722 reassigns the slow flow 708 to a VC reserved for slow flows. Hence, the other regular flows, such as flow 710, can benefit from the full capacity of VC 711. Note that HBA 715 can use a variety of methods to detect a slow virtual target. In one embodiment, HBA 715 can determine the queue depth corresponding to a virtual target. If a queue is getting full, it means that the corresponding virtual target is not consuming data at a rate at which the data is received from the link, which may result in back pressuring through the network and cause congestion. Furthermore, if hosts 704 and 706 are virtual servers, it would be the HBA associated with these virtual servers that re-assigns the slow flow 708 to a different VC.

Figure 8:
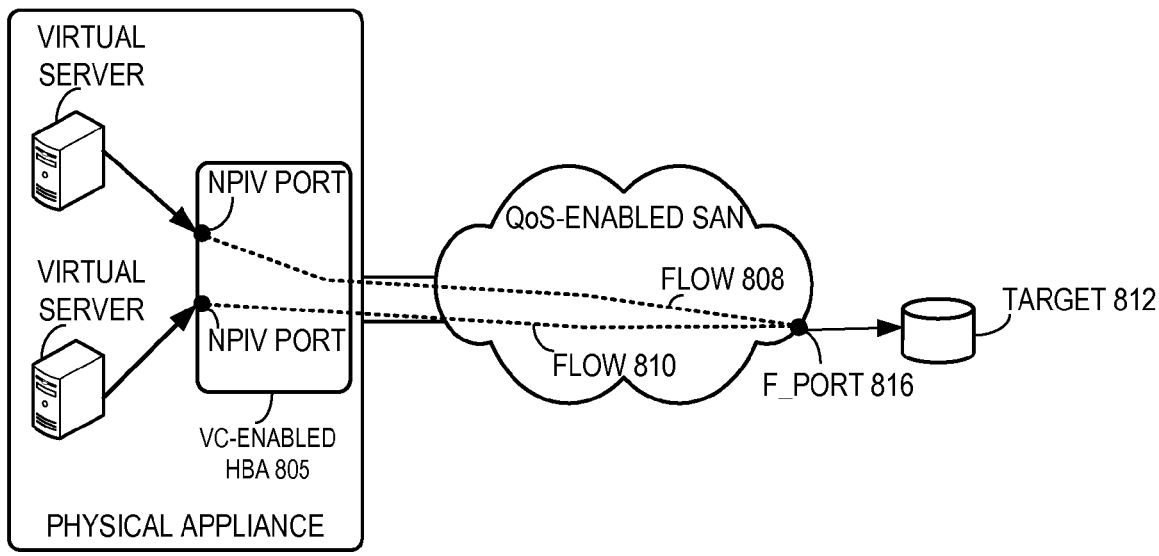
FIG. 8 illustrates how an egress switch can detect and report slow data flows to HBAs coupled to virtual servers, in accordance with an embodiment of the present invention.

It is possible that not all the HBAs in a SAN are VC-enabled. For example, as illustrated in FIG. 8, the endpoint of VCs to a slow target 812 can be an F_Port 816 on an egress switch, and slow flows 808 and 810 can be initially assigned to the VCs by a VC-enabled HBA 805. In this case, the detection of the slow destination occurs at egress F_Port 816, and the notification of this slow destination is communicated to HBA 805, as well as other devices in the SAN. As a result, HBA reassigns flows 808 and 810 to a VC reserved for slow flows.

Figure 9:
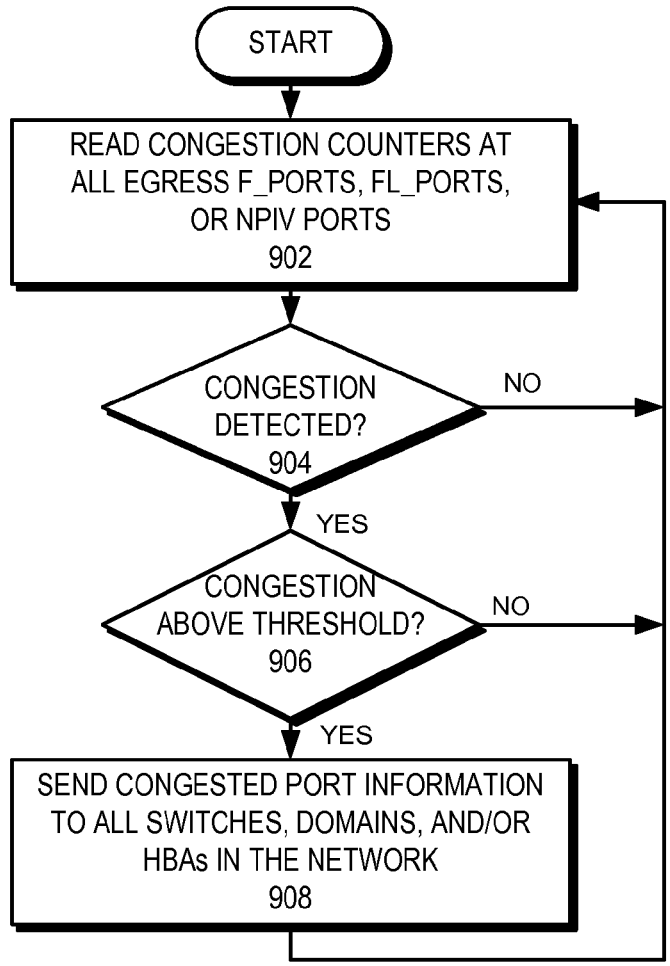
FIG. 9 presents a flowchart illustrating the process of detecting and reporting slow flows, in accordance with an embodiment of the present invention.

FIG. 9 presents a flowchart illustrating the process of detecting and reporting slow flow, in accordance with an embodiment of the present invention. During operation, an egress switch continuously monitors its egress ports, including both F_Ports and FL_Ports, for potential congestion (operation 902). Alternatively, a VC-enabled HBA can monitor its NPIV ports for potential congestion. Next, the switch or HBA determines whether congestion has been detected (operation 904). If so, the switch or HBA further determines whether the congestion is above a predetermined threshold (operation 906). If no congestion is detected, or if the congestion is below the threshold, the switch or HBA continues to monitor the ports (operation 902). If the congestion is above the threshold, the switch or HBA then sends information about the congested port to all the switches, domains, and/or HBAs in the network, so that the start points of the VCs carrying the slow flows can reassign these flows (operation 908).

Figure 10:
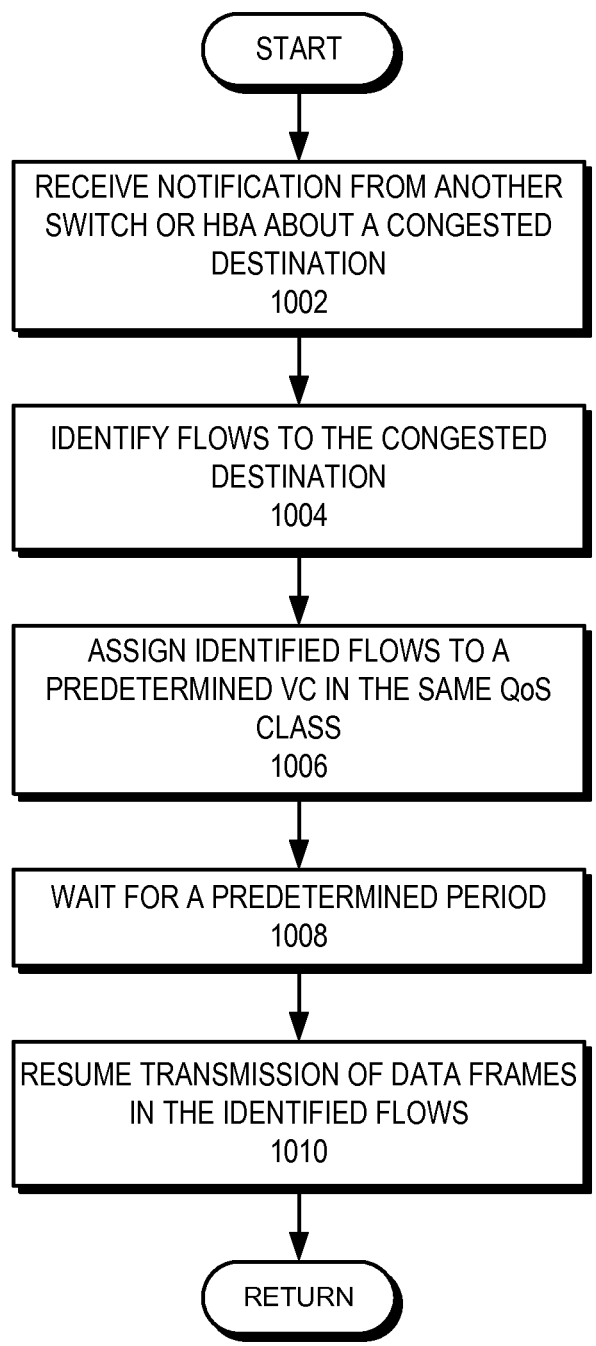
FIG. 10 presents a flowchart illustrating the process of automatically adjusting the data flows in virtual channels after receiving a notification of slow flows, in accordance with an embodiment of the present invention.

FIG. 10 presents a flowchart illustrating the process of automatically adjusting the data flows in virtual channels after receiving a notification of slow flows, in accordance with an embodiment of the present invention. During operation, an ingress switch or a VC-enabled HBA receives a notification from another switch or HBA about a congested destination (operation 1002). The switch or HBA then identifies the flows which are initially assigned to VCs at the same switch or HBA and which are destined to the congested destination (operation 1004).

Next, the switch or HBA assigns the identified slow flows to a predetermined VC in the same QoS class as the VC the slow flows were previously on (operation 1006). Note that reassigning the slow flows to a different VC might result in out-of-order delivery. In one embodiment, the ingress switch or HBA waits for a predetermined period so that the outstanding data frames for the slow flows on the previous VCs are delivered before transmission on the newly assigned VC resumes (operation 1008). The switch then resumes transmission of data frames in the identified flows (operation 1010).

Figure 11:
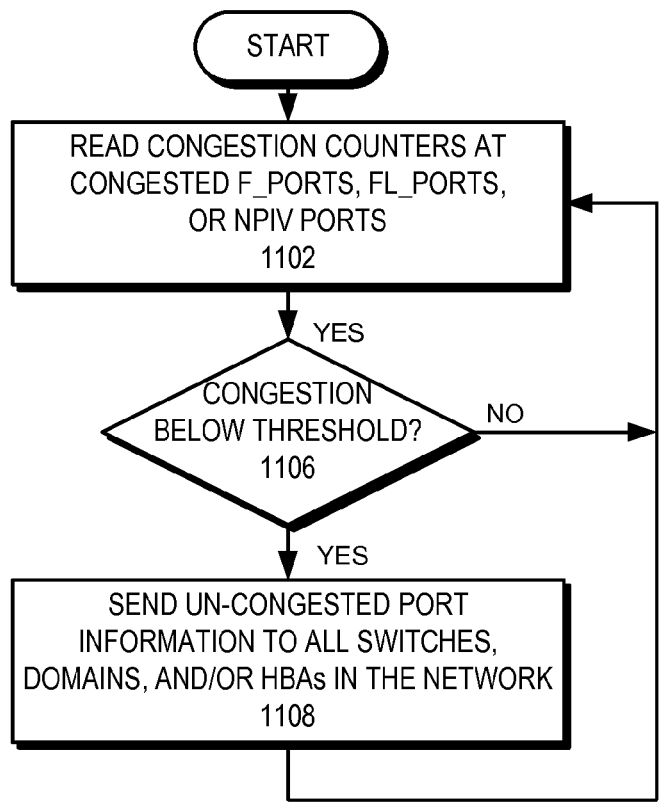
FIG. 11 presents a flowchart illustrating the process of detecting when a port associated with a destination is no longer underutilized and reporting the un-congested port, in accordance with an embodiment of the present invention.

In one embodiment, when a flow is no longer slow, it is possible to move this flow back to a regular VC, so that it is not slowed down by other slow flows. FIG. 11 presents a flowchart illustrating the process of detecting when a port associated with a destination is no longer underutilized and reporting the recovered port, in accordance with an embodiment of the present invention. During operation, an egress switch or VC-enabled HBA continuously monitors its congested F_Ports, FL_Ports, or NPIV ports (operation 1102). The switch or HBA then determines if the port's congestion is below a predetermined threshold (operation 1106). If so, the switch or HBA sends information about the un-congested port to all the switches, domains, and/or HBAs in the network, so that the start points of the VCs carrying the un-congested flows can reassign these flows to regular VCs (operation 1108). If the congestion is not below the threshold, the switch or HBA continues to monitor the ports (operation 1102).

Figure 12:
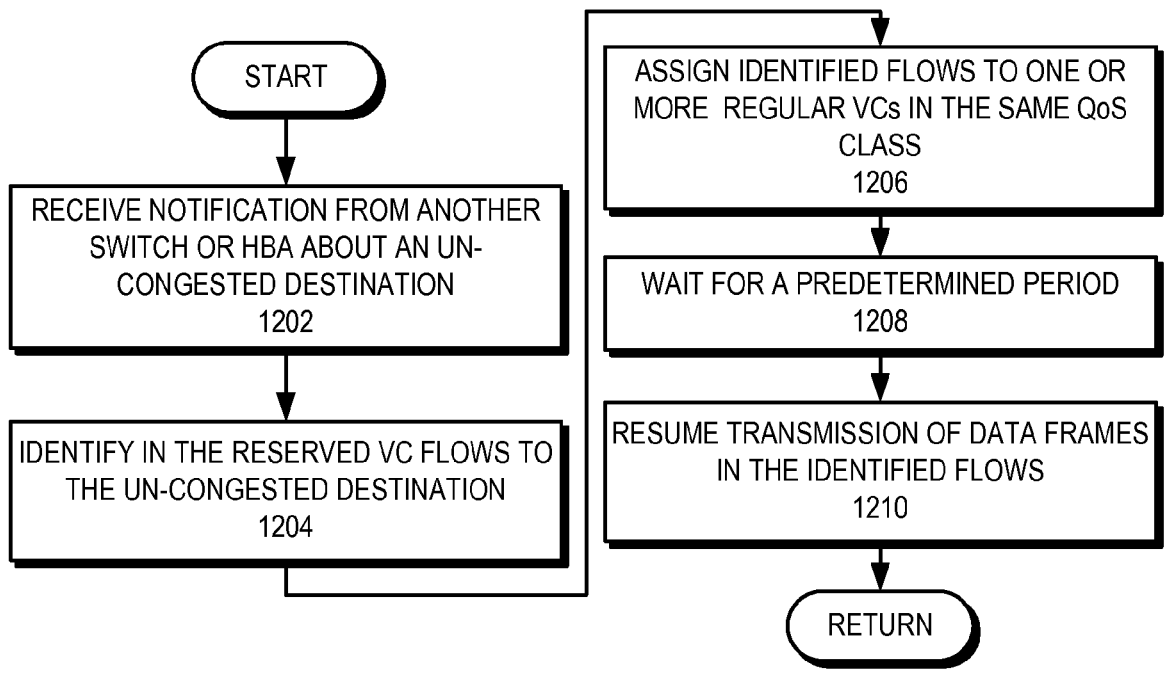
FIG. 12 presents a flowchart illustrating the process of assigning a data flow that is no longer slow to a regular virtual channel, in accordance with an embodiment of the present invention.

FIG. 12 presents a flowchart illustrating the process of assigning a data flow that is no longer slow to a regular virtual channel, in accordance with an embodiment of the present invention. During operation, an ingress switch or a VC-enabled HBA receives a notification from another switch or HBA about an un-congested destination (operation 1202). The switch or HBA then identifies, in the VC reserved for slow flows, the flows that are destined to the un-congested destination (operation 1204).

Next, the switch or HBA assigns the identified flows to one or more regular VCs in the same QoS class (operation 1206). Subsequently, the switch or HBA waits for a predetermined period so that the outstanding data frames for the moved flows are delivered (operation 1208). The switch or HBA then resumes transmission of data frames in the identified flows (operation 1210)

In some embodiments, it is possible for the egress switch or VC-enabled HBA to detect a slow flow's source device using, for example, a mechanism described in U.S. patent application Ser. No. 11/782,894, entitled "Method and Apparatus for Determining Bandwidth-Consuming Frame Flows in a Network," by inventor Amit Kanda, filed 25 Jul. 2007. Hence, instead of broadcasting the congested port information throughout the network, the egress switch or HBA can only notify the source devices of the slow flows. However, the source-specific monitoring process can be computationally slow and expensive.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A method, comprising:
receiving data frames via one or more logical channels on a network link, wherein a respective logical channel can transport a plurality of data flows;
identifying a slow data flow in a first logical channel;
assigning the slow data flow to a second logical channel, thereby precluding the slow data flow from slowing down other data flows in the first logical channel; and
forwarding the data frames in the slow data flow via the second logical channel onto an outgoing link.

2. The method of claim 1, wherein a respective logical channel is associated with a quality-of-service (QoS) class.

3. The method of claim 1, wherein the second logical channel is reserved for slow data flows in a same QoS class as the first logical channel.

4. The method of claim 1, further comprising dynamically allocating the second logical channel, wherein prior to being assigned to a slow data flow the second logical channel can be used for regular data flows.

5. The method of claim 1, further comprising suspending the forwarding of the data frames in the slow data flow subsequent to assigning the slow data flow to the second logical channel, thereby preventing out-of-order delivery of the data frames.

6. The method of claim 1, wherein identifying the slow data flow comprises receiving a notification from a switch or a network interface coupled to a destination device corresponding to the slow data flow.

7. The method of claim 1, wherein when the slow data flow is no longer sufficiently slow to slow down another data flow, the method further comprises assigning this previously slow data flow to a logical channel which is different from the second logical channel.

8. The method of claim 7, further comprising receiving a notification from a switch or a network interface coupled to a destination device corresponding to the previously slow data flow.

9. A method, comprising:
receiving data frames on a first logical channel;
wherein the data frames are destined to a destination device; and
wherein a respective logical channel can transport a plurality of data flows;
determining that the destination device is congested; and
sending to a switch or network interface a notification which identifies the destination device, thereby allowing the data frames destined to that destination device to be assigned to a second logical channel to prevent such data frames from slowing down other data flows on the first logical channel.

10. The method of claim 9, wherein determining that the destination device is congested comprises determining the amount of time a respective data frame is buffered before the data frame is transmitted to the destination device.

11. The method of claim 9, further comprising determining the source of the data frames; and
wherein the notification is only sent to the switch or network interface coupled to the source.

12. An apparatus, comprising:
a receiving module operable to receive data frames via one or more logical channels on a network link, wherein a respective logical channel can transport a plurality of data flows;
a slow-flow identification module operable to identify a slow data flow in a first logical channel;
a logical-channel adjustment module operable to assign the slow data flow to a second logical channel, thereby precluding the slow data flow from slowing down other data flows in the first logical channel; and
a data-frame forwarding module operable to forward the data frames in the slow data flow via the second logical channel onto an outgoing link.

13. The apparatus of claim 12, wherein a respective logical channel is associated with a quality-of-service (QoS) class.

14. The apparatus of claim 12, wherein the second logical channel is reserved for slow data flows in the same QoS class as the first logical channel.

15. The apparatus of claim 12, wherein the logical-channel adjustment module is further operable to dynamically allocate the second logical channel, wherein prior to being assigned to a slow data flow the second logical channel can be used for regular data flows.

16. The apparatus of claim 12, wherein the data frame forwarding module is further operable to suspend the forwarding of the data frames in the slow data flow subsequent to reassigning the slow data flow to the second logical channel, thereby preventing out-of-order delivery of the data frames.

17. The apparatus of claim 12, wherein while identifying the slow data flow, the slow-flow identification module is operable to receive a notification from a switch or a network interface coupled to a destination device corresponding to the slow data flow.

18. The apparatus of claim 12, wherein when the slow data flow is no longer sufficiently slow to slow down another data flow, the logical-channel adjustment module is further operable to assign this previously slow data flow to a logical channel which is different from the second logical channel.

19. The apparatus of claim 18, wherein the logical-channel adjustment module is further operable to receive a notification from a switch or a network interface coupled to the destination device corresponding to the previously slow data flow.

20. An apparatus, comprising:
a receiving module operable to receive data frames on a first logical channel;
wherein the data frames are destined to a destination device; and
wherein a respective logical channel can transport a plurality of data flows;
a congestion determination module operable to determine that the destination device is congested; and
a notification module operable to send to a switch or network interface a notification which identifies the destination device, thereby allowing the data frames destined to that destination device to be assigned to a second logical channel to prevent such data frames from slowing down of other data flows on the first logical channel.

21. The apparatus of claim 20, wherein while determining that the destination device is congested, the congestion determination module is further operable to determine the amount of time a respective data frame is buffered before the data frame is transmitted to the destination device.

22. The apparatus of claim 20, further comprising a source determination module operable to determine the source of the data frames; and
wherein the notification is only sent to the switch or network interface coupled to the source.

* * * * *

UNITED STATES PATENT AND TRADEMARK OFFICE
CERTIFICATE OF CORRECTION

PATENT NO. : 8,737,230 B2
APPLICATION NO. : 12/913147
DATED : May 27, 2014
INVENTOR(S) : Amit Kanda et al.

Page 1 of 1

It is certified that error appears in the above-identified patent and that said Letters Patent is hereby corrected as shown below:

On The Title Page,
In Abstract (57) (line 3), please correct the word "Fiber" to read "Fibre" so the line reads --Fibre Channel (FC) network.--

Signed and Sealed this
Tenth Day of February, 2015

Michelle K. Lee
*Deputy Director of the United States Patent and Trademark Office*